United States Patent
Wax et al.

(10) Patent No.: US 8,295,258 B2
(45) Date of Patent: Oct. 23, 2012

(54) ENHANCING WLAN PERFORMANCE IN THE PRESENCE OF INTERFERENCE

(75) Inventors: Mati Wax, Haifa (IL); Reuven Tweg, Misgav (IL); Avi Steiner, Kiriat Motzkin (IL); Hanan Leizerovich, Petah Tikva (IL); Evgeny Levitan, Haifa (IL); Aviv Aviram, Bat Shelomo (IL)

(73) Assignee: Wavion, Ltd, Yoqne'am-Illit (IL)

( * ) Notice: Subject to any disclaimer, the term of this patent is extended or adjusted under 35 U.S.C. 154(b) by 428 days.

(21) Appl. No.: 12/657,549

(22) Filed: Jan. 21, 2010

(65) Prior Publication Data

US 2010/0208712 A1  Aug. 19, 2010

Related U.S. Application Data

(60) Provisional application No. 61/207,979, filed on Feb. 17, 2009.

(51) Int. Cl.
*H04W 4/00* (2009.01)
(52) U.S. Cl. ........................................................ 370/338
(58) Field of Classification Search .................. 370/203, 370/204–215, 229–253, 310–337, 338–350, 370/395.1, 395.3, 395.4, 395.41, 395.42, 370/395.5, 395.52, 412–421, 431–529
See application file for complete search history.

(56) References Cited

U.S. PATENT DOCUMENTS

| | | | | |
|---|---|---|---|---|
| 6,067,290 | A * | 5/2000 | Paulraj et al. | 370/329 |
| 6,240,098 | B1 * | 5/2001 | Thibault et al. | 370/431 |
| 6,621,454 | B1 | 9/2003 | Reudink et al. | |
| 6,711,219 | B2 * | 3/2004 | Thomas et al. | 375/346 |
| 6,785,513 | B1 * | 8/2004 | Sivaprakasam | 455/63.1 |
| 6,990,137 | B2 * | 1/2006 | Smee et al. | 375/142 |
| 7,076,168 | B1 * | 7/2006 | Shattil | 398/76 |
| 7,209,515 | B2 * | 4/2007 | Kilfoyle et al. | 375/152 |
| 7,289,481 | B2 * | 10/2007 | Wax et al. | 370/338 |
| 7,372,890 | B2 | 5/2008 | Batra et al. | |
| 7,418,274 | B2 * | 8/2008 | Hood, III | 455/562.1 |
| 7,430,168 | B2 * | 9/2008 | Yamaura et al. | 370/230.1 |
| 7,430,257 | B1 * | 9/2008 | Shattil | 375/347 |
| 7,433,384 | B2 * | 10/2008 | Smee et al. | 375/142 |
| 7,593,449 | B2 * | 9/2009 | Shattil | 375/130 |
| 7,629,880 | B2 * | 12/2009 | Stilp et al. | 340/508 |
| 7,630,344 | B1 * | 12/2009 | Kilfoyle et al. | 370/334 |
| 7,724,850 | B2 * | 5/2010 | Kroeger et al. | 375/347 |
| 7,965,761 | B2 * | 6/2011 | Shattil | 375/147 |
| 8,031,794 | B2 * | 10/2011 | Mostafa | 375/267 |
| 8,078,110 | B2 * | 12/2011 | Li et al. | 455/63.1 |
| 2004/0001539 | A1 * | 1/2004 | Sankaran et al. | 375/231 |
| 2004/0004935 | A1 * | 1/2004 | Zhu et al. | 370/208 |
| 2004/0028121 | A1 * | 2/2004 | Fitton | 375/144 |

(Continued)

*Primary Examiner* — Kwang B Yao
*Assistant Examiner* — Jung-Jen Liu
(74) *Attorney, Agent, or Firm* — Lumen Patent Firm (57) ABSTRACT

A wireless access point coherently receives signals transmitted from client devices and from interfering devices, measures noise and interference capture samples from the received signals, and computes a characterization of noise plus interference. Receive gains and threshold levels are adjusted based on the computed noise plus interference characterization. A set of weights for an interference suppression spatial filter are calculated from the measured noise and interference capture samples and used to produce a filtered signal by spatially filtering the received signals such that interference is spatially nulled in the filtered signal. The method may also include setting PHY parameters at the wireless access point based on the computed noise plus interference characterization. In some embodiments, a protection transmission is transmitted from the wireless access point, requesting connected client devices to suspend transmissions during a specified time period.

11 Claims, 11 Drawing Sheets

U.S. PATENT DOCUMENTS

| | | | |
|---|---|---|---|
| 2005/0047384 A1* | 3/2005 | Wax et al. | 370/338 |
| 2005/0213556 A1* | 9/2005 | Wax et al. | 370/349 |
| 2006/0052138 A1* | 3/2006 | Reilly et al. | 455/561 |
| 2006/0120439 A1* | 6/2006 | Smee et al. | 375/148 |
| 2007/0121705 A1* | 5/2007 | French et al. | 375/130 |
| 2007/0203744 A1* | 8/2007 | Scholl | 705/2 |
| 2007/0263744 A1* | 11/2007 | Mostafa | 375/267 |
| 2008/0292032 A1 | 11/2008 | Belogolovy et al. | |
| 2009/0110033 A1* | 4/2009 | Shattil | 375/141 |
| 2009/0247107 A1* | 10/2009 | Roy et al. | 455/307 |

* cited by examiner

ENHANCING WLAN PERFORMANCE IN THE PRESENCE OF INTERFERENCE

CROSS-REFERENCE TO RELATED APPLICATIONS

This application claims priority from U.S. Provisional Patent Application 61/207,979 filed Feb. 17, 2009, which is incorporated herein by reference.

FIELD OF THE INVENTION

The present invention relates generally to wireless communications, and specifically to methods and systems for improving the performance of wireless local area networks operating in the presence of interference in license-exempt bands.

BACKGROUND OF THE INVENTION

Wireless local area networks (WLANs) are gaining in popularity, and the demand for WLAN bandwidth is growing. The original WLAN standards, such as IEEE 802.11, were designed to enable communications at 1-2 Mbps in a band around 2.4 GHz. More recently, IEEE working groups have defined the 802.11a, 802.11b, 802.11g and 802.11n extensions to the original standard, in order to enable higher data rates. The 802.11a standard, for example, provides data rates up to 54 Mbps in the 5 GHz band using a multi-tone, orthogonal frequency division multiplexing (OFDM) modulation. The 802.11b standard defines data rates up to 11 Mbps using a single-carrier modulation scheme in the 2.4 GHz band. The newer 802.11g standard permits data rates up to 54 Mbps in the 2.4 GHz band using OFDM, and it is also backward-compatible with legacy 802.11b products. The emerging 802.11n standard allows up to 130 Mbps mandatory support with at least two transmit antennas, and thus it extends WLAN devices to support multiple-input multiple-output (MIMO) technology. Optional modes in this evolving standard allow achieving data rates up to 600 Mbps. In the context of the present patent application and in the claims, the term "802.11" is used to refer collectively to the original IEEE 802.11 standard and all its variants and extensions, unless specifically noted otherwise.

In 802.11 WLANs, a fixed access point communicates on a predetermined frequency channel with wireless clients (also referred to as "stations") in its vicinity. The group of stations communicating with the same access point is referred to as a basic service set (BSS). Generally, with the exception of certain broadcast messages, the access point can transmit downlink signals only to one station at a time. Otherwise, the stations would receive multiple, interfering signals, which they would then be unable to decode. Similarly, to prevent simultaneous uplink transmissions, the 802.11 standard provides a contention avoidance mechanism, which requires a station to refrain from transmitting when it senses other transmissions on its frequency channel. However, when operating in license-exempt frequency bands, there may be other devices operating on the same band as the access point, which may not follow the contention avoidance mechanism, and thus create interference to the access point (AP) and clients.

The characteristics of the interference existing in license-exempt bands such as the 2.4 GHz may vary in time and nature. The interference may have fast time variation, with a coherence time close to one packet duration, or it may have a slow time variation, with a coherence time of multiple packets. The bandwidth of the interference, measured with respect to the WLAN signal bandwidth, may also vary, with both wideband and narrowband interference being common. This means that the interference environment of a WLAN AP is unpredictable and can have widely varying characteristics.

SUMMARY OF THE INVENTION

Embodiments of the present invention provide methods and systems for enhanced operation of a WLAN system in presence of interference, using multiple antennas at the access point (AP).

The present invention provides two main approaches for improving AP operation in the presence of interference. The first approach utilizes offline processing for tuning the system PHY parameters, using a dedicated dynamic interference handling (DIH) processor. The DIH triggers and analyzes captured samples of noise and interference and sets the PHY parameters accordingly. The second approach utilizes a real-time per-packet processing, where after a valid signal is detected or after a successful transmission, the last available capture of noise and interference is used to calculate and set the weights (coefficients) of an interference suppression spatial filter (ISSF) that nulls the interference.

The dynamic interference handling (DIH) processor collects captures of noise and interference sampled by a multi-antenna capture buffer. The DIH processor then computes the energy level of every capture, which reflects the interference plus noise level at the time instants corresponding to the captures. Based on this level, it may accordingly set a new receive (Rx) gain and detection thresholds to achieve a desired new sensitivity. It may as well adjust the correlation detection threshold for valid WLAN signals so that the false alarm rate is sufficiently low.

The use of the interference suppression filter (ISSF) depends on the nature of the interference environment. For an environment with rather constant interference characteristics, the DIH processor analyzes the long term interference and calculates the ISSF coefficients which spatially null this long term interference. An example for such a case is when an AP is located near another wireless device that radiates high energy in a frequency band overlapping with the AP. In this case the DIH will set the ISSF coefficients so as to spatially-null the interfering device.

In dynamically changing interference environments, the signal detection mechanism is used to trigger captures of interference by the DIH processor. These captures are then used to compute the coefficient of the ISSF to be applied right before input signal ramp-up. In the detailed description of the invention we outline several methods for calculation and implementation of efficient interference suppression filters.

In one aspect, the present invention provides a method for communications over a wireless local area network. A wireless access point coherently receives signals transmitted from client devices and from interfering devices using multiple antennas connected to a common local oscillator. The access point measures noise and interference capture samples from the received signals and computes a characterization of noise plus interference. The noise and interference capture samples may be measured using various techniques including for example, detecting a valid WLAN signal and processing buffered samples captured just prior to the detected valid WLAN signal, processing buffered samples captured during default Rx mode, processing buffered samples captured after the wireless access point returns an ACK on a received packet, and/or processing buffered samples captured during long duration CCA-ED in which no valid WLAN signal is found. The method may also include determining a type of interference as being of short duration or long duration. The computed noise plus interference characterization may include various characterizations including, for example, a noise energy level and a correlation of interference with a preamble of WLAN signals, an average interference level during specified sample periods, and an average of highest values of interference level. Receive gains and threshold levels are adjusted based on the computed noise plus interference characterization. The method may also include adjusting a correlation detection threshold based on the computed noise plus interference characterization. A set of weights for an interference suppression spatial filter are calculated from the measured noise and interference capture samples and used to produce a filtered signal by spatially filtering the received signals such that interference is spatially nulled in the filtered signal. The method may also include setting PHY parameters at the wireless access point based on the computed noise plus interference characterization. In some embodiments, a protection transmission is transmitted from the wireless access point, requesting connected client devices to suspend transmissions during a specified time period.

DETAILED DESCRIPTION OF THE EMBODIMENTS

Figure 1:
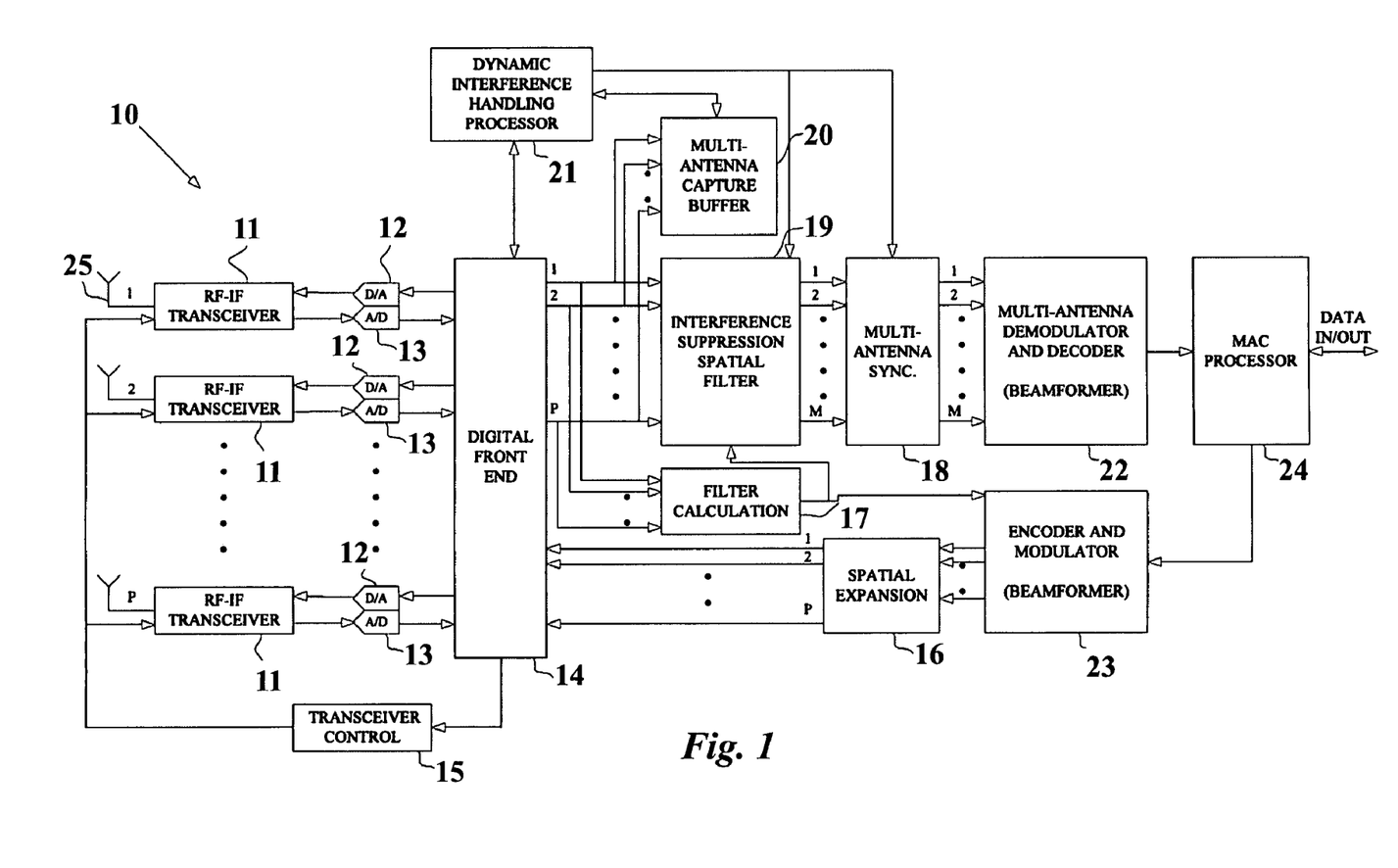
FIG. 1 is a schematic illustration of a WLAN access point (AP) system, with dynamic interference handling (DIH) processor and dynamic interference suppression filters, according to an embodiment of the invention.

FIG. 1 presents a block diagram of a wireless LAN (WLAN) access point (AP) 10 capable of coping with interference according to the disclosure of this invention. The WLAN AP includes P antennas 25 and P RF-IF transceivers 11 which operate with a common local oscillator (not shown) and thus enable multi-antenna coherent processing. The RF-IF transceivers 11 are jointly controlled by the transceiver control 15 whose task is to commonly adjust the receive gain and control the Tx/Rx mode switching. On the receive path, the RF-IF transceivers convert the RF signal into a base-band signal and input it to the A/D 13. The A/D 13 converts the analog input into a digital signal, which is input to the digital front-end (FE) 14. On the transmit path, every D/A 12 receives a digital input and converts it to an analog signal, which is input in base-band to the RF-IF transceivers 11 and then output in RF to the P antennas 25.

The digital FE 14 includes an automatic gain control (AGC) mechanism. The DIH processor 21 configures the AGC reset value which determines the system receive sensitivity. The digital FE also sets the Tx and Rx gains in the RF-IF transceivers 11. The P outputs of the digital FE are passed to the interference suppression spatial filter (ISSF) 19, which is part of the data path. These outputs are also fed to the filter calculation 17, which computes the coefficients of the ISSF. The details of the ISSF computation and examples of its implementation are given in the ISSF description part. The output of the ISSF consists of M channels, where M≦P. The reduction in degrees of freedom is a result of the interference suppression.

First Approach—Dynamic Interference Handling (DIH)

The dynamic interference handling (DIH) processor 21 collects the noise capture samples from the multi-antenna capture buffer 20 and computes the noise level and the correlation of the interference with the preamble of WLAN signals per every capture.

The multi-antenna capture buffer 20 is triggered with a special sequence of events. First, the MAC processor 24 initiates a protection transmission. This transmission is described in FIG. 3. In accordance with the 802.11 protocol, once the connected clients receive this transmission, they are expected to refrain from transmitting. This will allow the AP to capture only the interference, i.e., all non-WLAN based co-channel transmissions as well as the WLAN based transmissions on nearby channels. These are the classes of interferers that affect system performance and consequently those targeted by the DIH. After the interference capture is ready in the buffer 20, the DIH processor 21 reads the captured samples corresponding to the P antennas, obtained from the P outputs of the digital FE. The DIH processor 21 computes statistics from every capture. It may compute the average interference level. It may also compute the interference level in different periods along the capture, so as to characterize nature of the interference. It may also compute such parameters as the median value of interference level or the average of highest values of the interference level in the capture. Such measures allow interception of interferences which have a short duration or have some kind of duty cycle. In addition, it may compute the correlation of the interference with the preamble of WLAN signals. This is important, since an interference with high correlation with the preamble sequences of the WLAN signals may potentially trigger false detections of the system, and thereby waste systems resources.

The multi-antenna sync block 18 is responsible for the signal detection and timing synchronization. Its main purpose is to identify valid WLAN packets. Once a valid WLAN packet has been identified, it triggers the multi-antenna demodulator and decoder 22, indicating a start of a valid packet. The demodulator 22 performs a multi-antenna decoding of the WLAN signal and outputs a bit-stream corresponding to the decoded signal. Note that the demodulator 22 will be occupied for a duration corresponding to the expected length described in a signal field of the valid packet. This means that if the detection was a false alarm, i.e., if the demodulator received a trigger due to noise or interference, then the demodulator resources will be devoted to processing the interference instead of waiting for a valid signal. This naturally increases the probability of miss detection of a valid signal.

Multi-antenna demodulator and decoder 22 may include, for example, a maximal ratio combiner (MRC) based on the channel estimates. Another example is selection of the strongest channel out of M antennas at the input to the processing module 22. This approach is usually referred to as selection diversity.

The bit-stream output of the multi-antenna decoder 22 is composed of the hard decisions of the decoder. This bit-stream is passed to the MAC processor 24 for the validation of the hard decisions and for scheduling of the next operation (which may be transmission of an acknowledgement packet or any other transmit/receive transaction).

When the MAC processor 24 initiates a transmission, it passes an adequate command to the multi-antenna encoder and modulator 23, along with information data bits to be transmitted. The encoder 23 uses the proper rate and modulation dicated by the MAC command. If beamforming is employed, the bit stream is input to the beamformer 23 and the beamforming calculation is done by using precomputed weights provided by filter 17. The computation of the beamformer weights by filter 17 can be done based on the signals from DE 14. Alternatively, filter 17 could use the signals from ISSF 19. It may be advantageous to compute Tx weights based on the ISSF 19 output signals, in case the interference is a constant neighboring station. In other cases it would be advantageous to use the inputs to the ISSF 19 for computing Tx weights, as the client usually suffers from a different interference than that of the AP. If beamforming is not used, the modulated stream is directed to the spatial expansion 16 block.

The output of the encoder modulator 23 goes into a spatial expansion block 16, which receives up to P space-time streams. In case of P input streams, it passes the streams directly into the digital FE 14. Otherwise, it performs spatial expansion which includes, for example, insertion of cyclic shift delays with different values instead of duplicating the streams, thus eliminating unintentional beamforming. The digital FE 14 passes the P inputs directly to the P outputs, which are connected to the D/A 12 converters. The resulting analog signals are fed to RF transceivers 11 for transmission.

Figure 2:
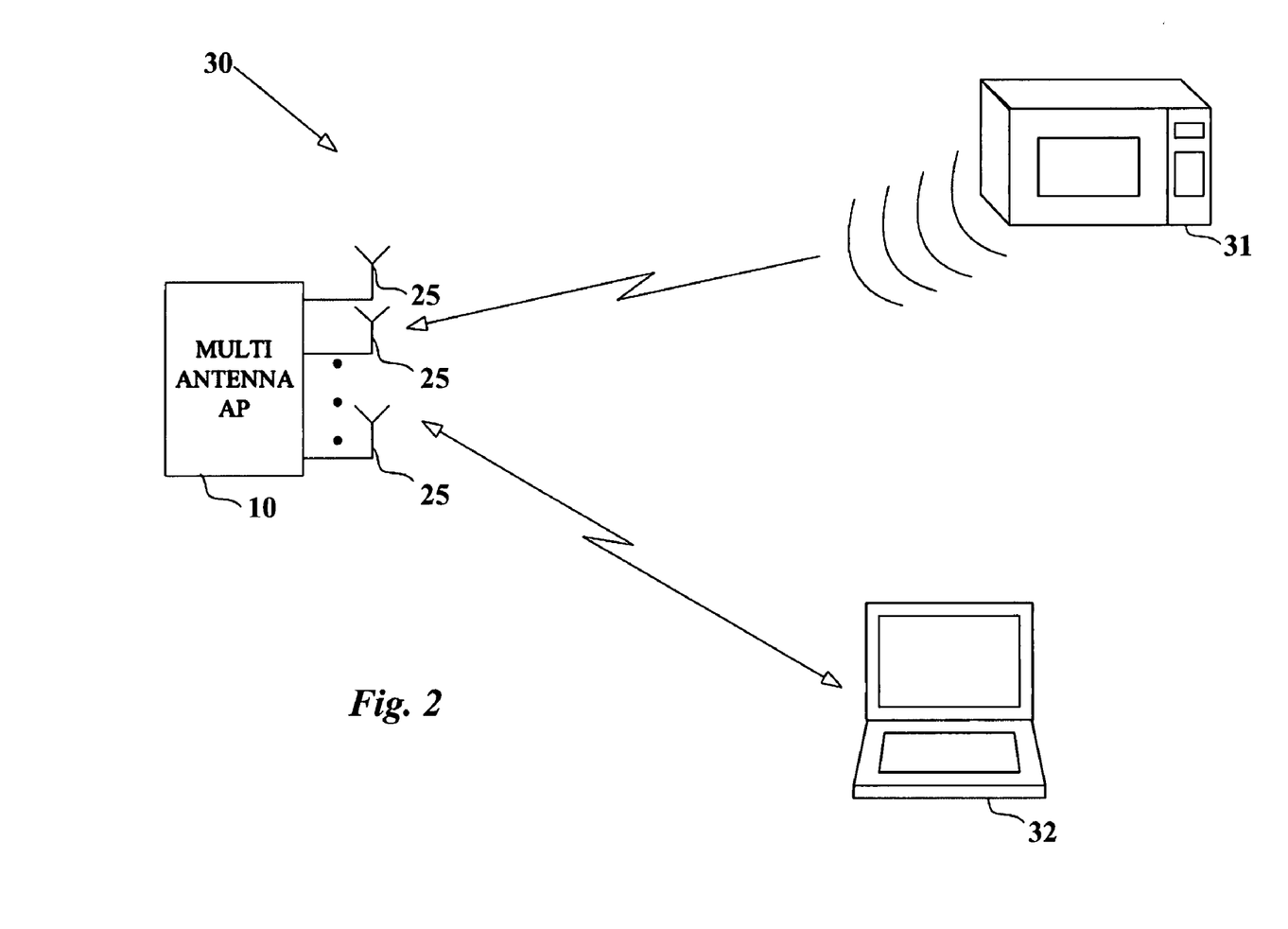
FIG. 2 is a pictorial illustration of the environment of a WLAN AP with wireless clients and interference sources, according to an embodiment of the invention.

FIG. 2 is a pictorial illustration of an exemplary scenario of a wireless communication system 30 including a WLAN AP 10 having multiple antennas 25 operating in presence of interference. The exemplary interference here is an arbitrary microwave oven 31. The microwave oven operates at a frequency of 2.450 GHz. Nearby AP 10 communicates with client 32 using one of channels 7, 8, 9, 10, 11, corresponding to center frequencies 2.442, 2.447, 2.452, 2.457, 2.462 GHz. Due to the close proximity of the frequencies used by AP 10 and the frequency of microwave oven 31, AP 10 may suffer from interference when the microwave oven operates. Since the microwave oven is not a WLAN device, it does not comply with the collision avoidance mechanism defined in the 802.11 standard, and does not perform clear channel assessment (CCA) before operating. Thus, it may operate simultaneously with a WLAN device.

The AP 10 may identify existence of such interference by sensing attributes of the channel before receiving a valid packet. That is, it may measure the noise level right before detection of a valid WLAN signal. Based on these measurements it may then compute ISSF coefficients to direct a null in the microwave oven direction. This interference is also an example of narrowband interference, thus nulling is required only for a specific sub-band. This is another alternative mode for ISSF, as will be described later.

In case the microwave oven 31 is working continuously for long durations (e.g. several minutes), it will appear in all the noise and interference captures performed by the DIH over a corresponding duration. An analysis of these captures will allow adjusting the AGC reset value (i.e., default gain setting and AGC trigger level) so that the noise floor is at a predetermined value. It will also allow adjusting the signal detection (sync) thresholds such that the false alarm rate due to this interference will be in the acceptable range. The AP may also set the detection thresholds such that detection is denied when signal power level is below a predefined value. This will ensure that erroneous detections due to low power signals and interference are avoided.

Figure 3:
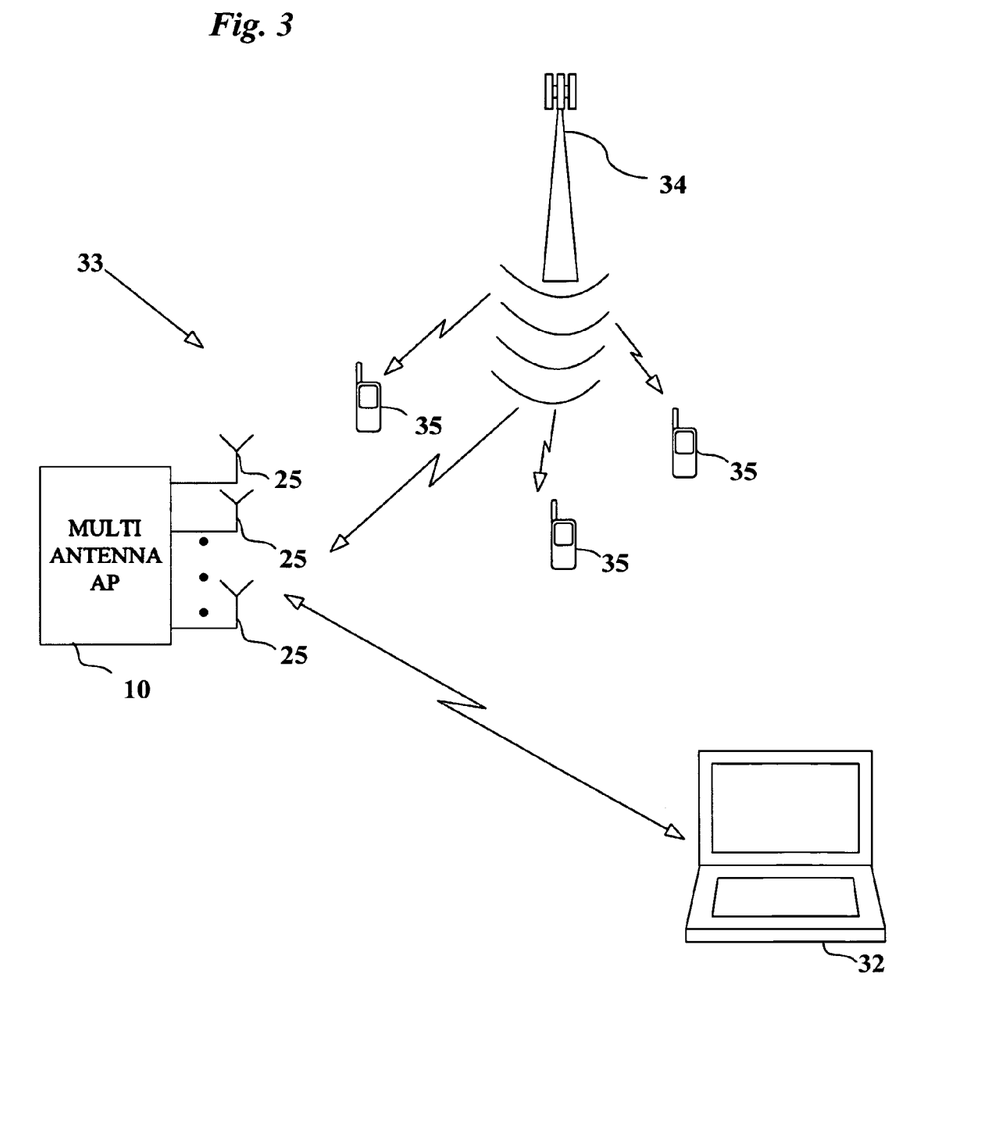
FIG. 3 is a pictorial illustration of an environment of a WLAN AP with a cellular base-station as the main interference source, according to an embodiment of the invention.

FIG. 3 illustrates a communication system 33 in which the AP 10 with antennas 25 is located in proximity to a cellular base-station 34 communicating will cell phones 35. The base-station does not transmit in the AP frequencies, however the out-of-band power it transmits in the 2.4 GHz might be high enough so as to interfere with the AP and prevent operation at its highest sensitivity when communicating with its client 32. Since the cell tower 34 is a single source of interference, the AP 10 can point a null to this interference source using the ISSF which is described below.

Figure 4:
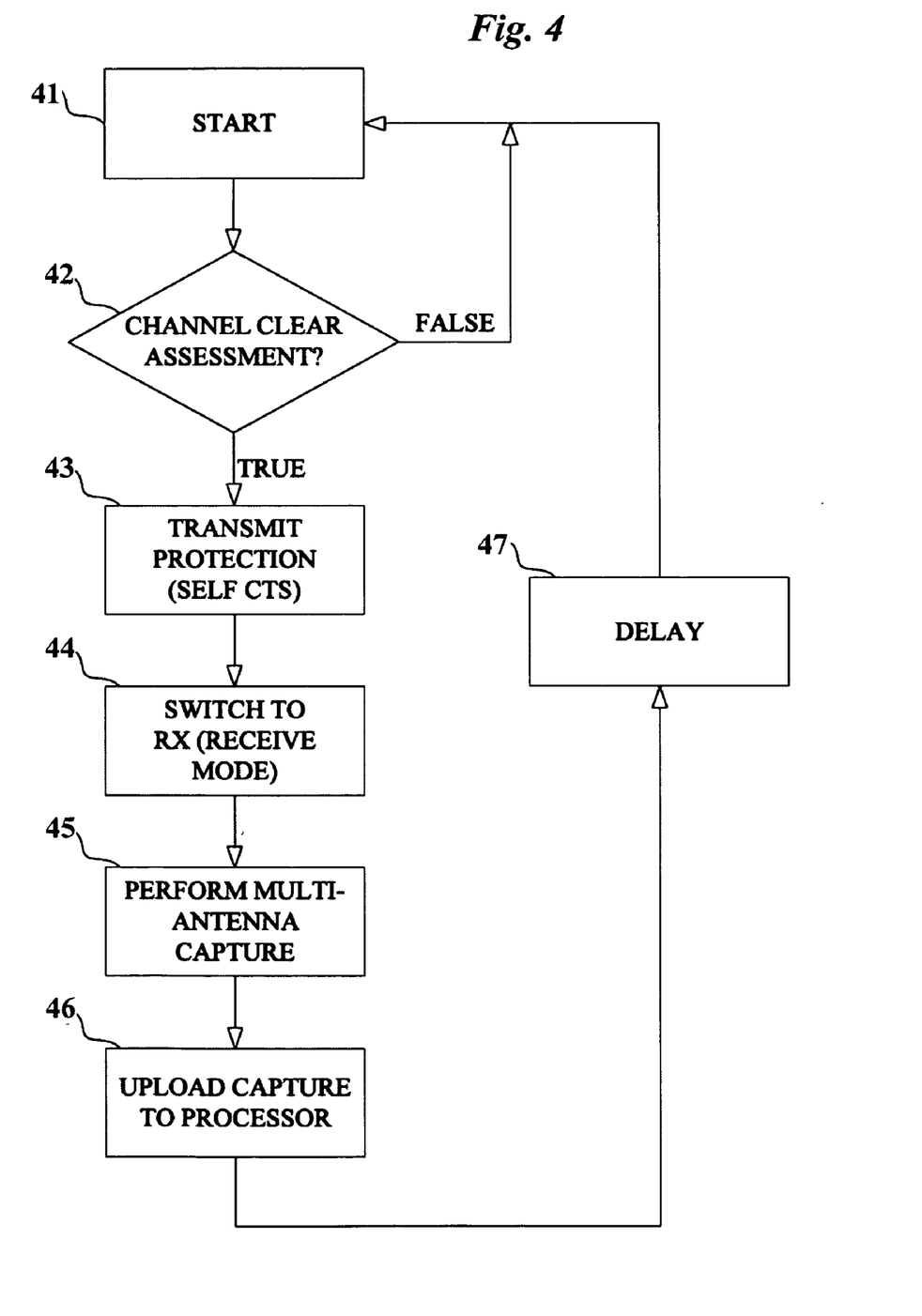
FIG. 4 is a flowchart of the process of capturing noise and interference, according to an embodiment of the invention.

FIG. 4 is a flowchart describing an exemplary interference-plus-noise capture process. The process starts in step 41 when it receives an adequate command from the MAC processor. In step 42 it checks whether or not the channel is clear, that is, whether activity is sensed. This is an energy sensing mechanism, which is part of the collision avoidance of the 802.11 standard. If the channel is not clear, the step is repeated. When the channel is clear (CCA is true) the process continues by transmitting a self-CTS packet in step 43. This packet obliges the clients of the AP to update their NAV and to remain silent for a duration specified in the self-CTS. This step is performed in order to increase probability that the capture will contain only interferences.

Immediately after the self-CTS protection packet was transmitted in step 43, the AP switches to receive mode in step 44, and initiates a multi-antenna noise capture in step 45. The system remains in receive mode and expects to capture the interferences, with no reception from the clients. Yet, some interferers are burtsy and may not necessarily appear in every capture. Therefore multiple captures are done (as will be described next in FIG. 5). Every capture is analyzed by the DIH processor "offline". That is, after the capture is complete, the AP returns to its regular operational mode, while the DIH processor uploads in step 46 the capture samples and performs its analysis. The process then returns to the start step 41 after a delay in step 47.

Figure 5:
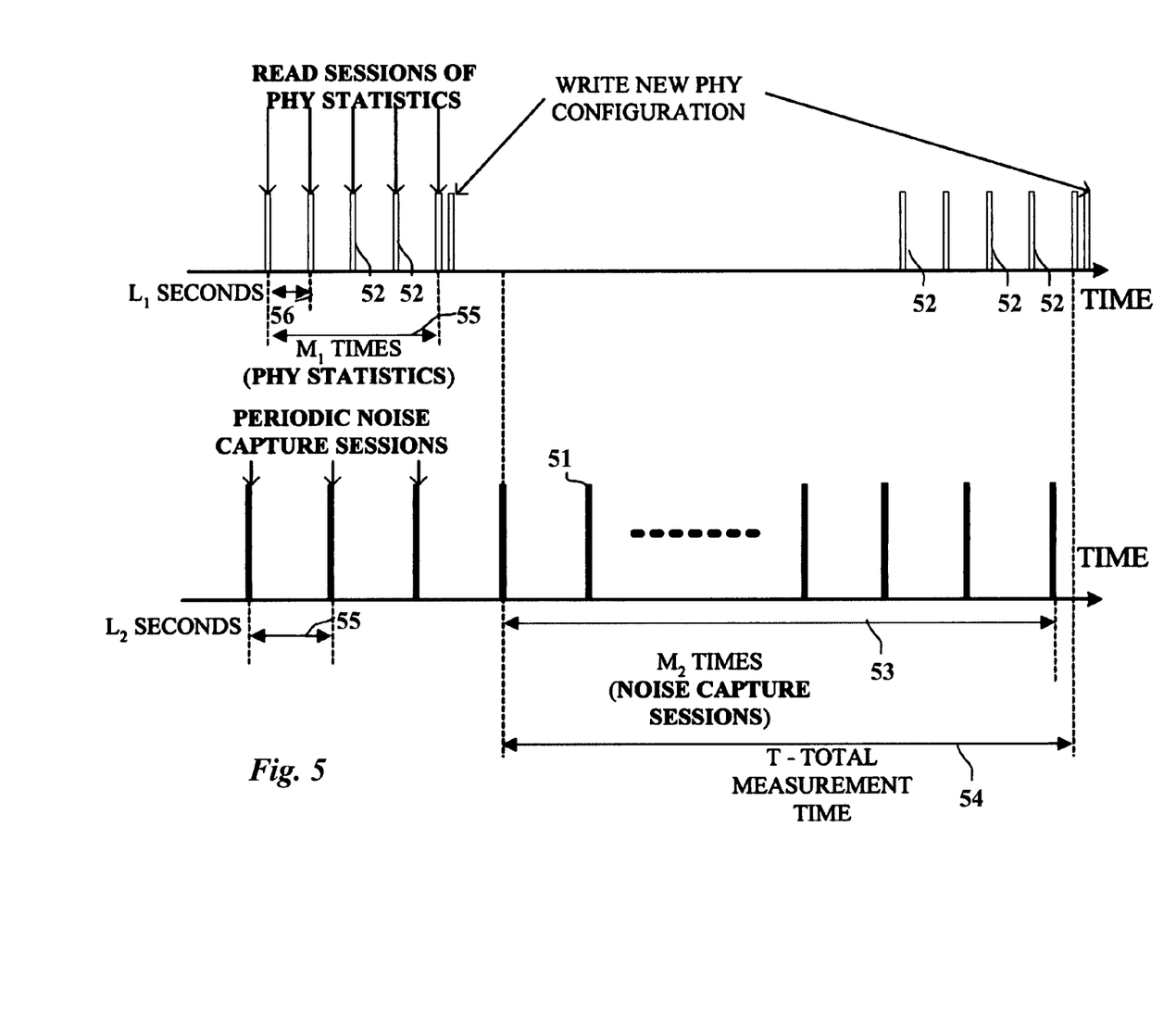
FIG. 5 is a timing diagram of the periodic noise captures and their periodic analysis, according to an embodiment of the invention.

FIG. 5 is a timing diagram of periodic interference-plus-noise captures, and their processing. The DIH processing includes periodic noise captures 51, as well as periodic sampling of PHY statistics 52. The periodic interference and noise captures occur every $L_2$ seconds 55, while every $L_1$ seconds 56 PHY statistics are sampled and processed. The PHY statistics sampling can be done more frequently since no protection transmission (which is time consuming) is involved.

After $M_1$ PHY statistic samples and $M_2$ captures, the DIH processor computes a new PHY configuration. Examples for PHY statistics include energy detection statistics, signal detection statistics, correlations with OFDM and single carrier preambles, and correlations with OFDM and single carrier preambles when no valid signal is found. These statistics may all be used to provide an improved PHY configuration.

Figure 6:
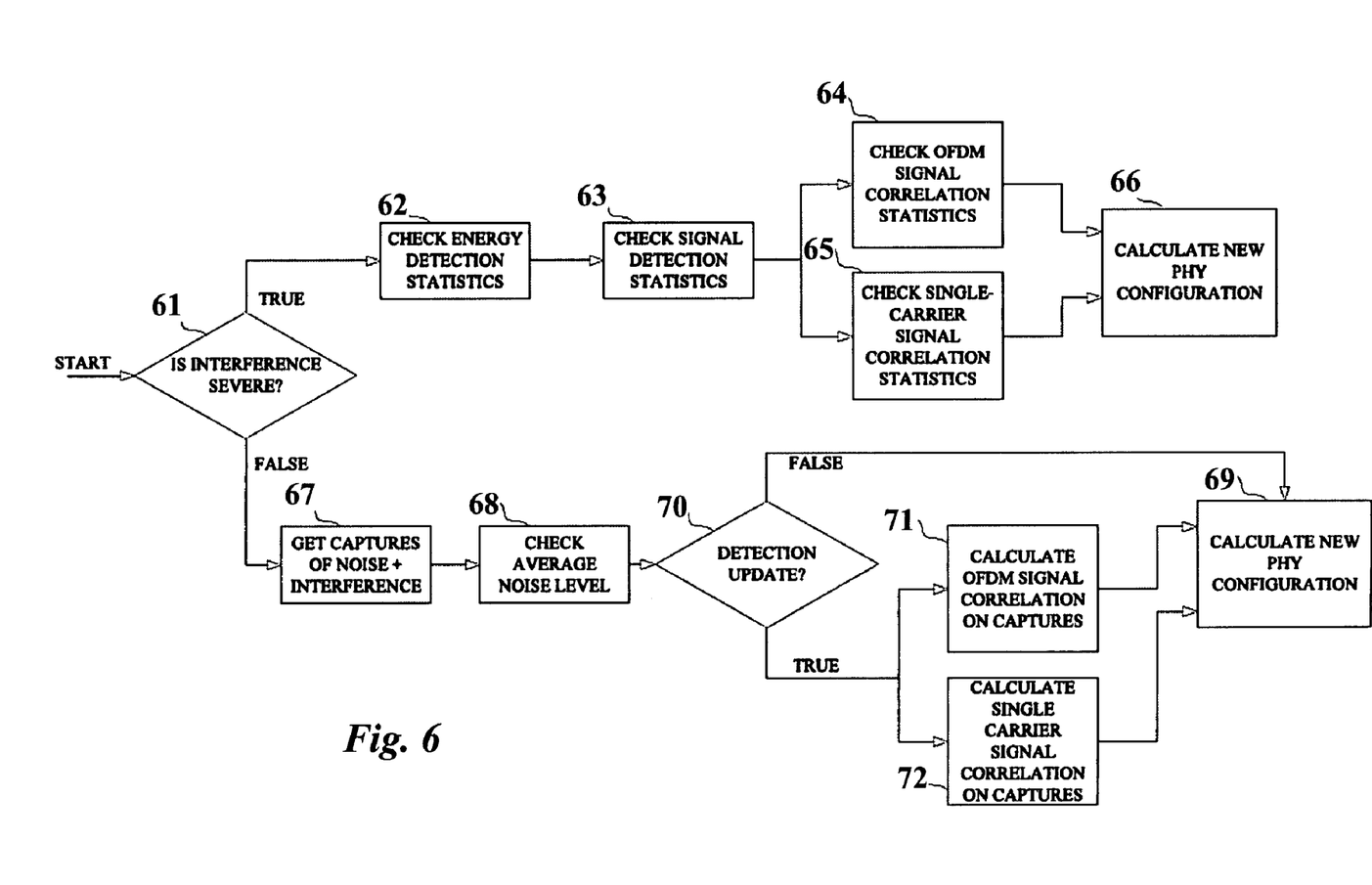
FIG. 6 is a flowchart of an exemplary process for analysis of noise captures in the DIH, according to an embodiment of the invention.

FIG. 6 gives an exemplary flowchart of the processing of the PHY statistics and captures. This processing starts by checking in step 61 whether or not the interference is severe. The severity of the interference is determined by the duration the AP is occupied with false alarms or energy detection. In this duration the AP cannot transmit at all, not even the required beacons, which is referred to as "lack-of-beacons" state. Such a state is considered to be very severe since after missing transmission of a few beacons the connected clients might disconnect and look for another AP. This has to be avoided, as loosing clients incurs a high network inefficiency price. In case of severe interference, the AP may have to delay beacon transmission till the CCA flag is high. This phenomena, referred to as "delay-of-beacons" may serve as an additional/complementary criterion for detecting severe interference.

Besides lack-of-beacons, severe interference can be declared when, for example, a high rate of false signal detection occurs in receive mode (Rx). When interference is severe, the process continues to step 62 in which the DIH processor first checks what was the portion that the energy detection (ED) crossed the threshold during receive mode (Rx). Clearly, if the ED is high for a large portion of Rx, this means that there is a strong interference, which triggers the CCA-ED for long durations. Since the AP cannot transmit as long as CCA-ED is high, the PHY configuration will cope with this interference by increasing the ED threshold.

In the next step 63, the DIH processor checks the invalid carrier sense (CS) signal detection statistics in order to determine whether the system is busy with false detections. This measures the relative time CCA-CS was raised but the packet was found to be invalid. A high invalid CCA-CS indication means that the AP has detected many invalid signals. This usually means that high rate of false alarms was evident.

Such high CCA-CS false alarm rate may occur, for example, if narrowband interference in some frequencies is highly correlated with the preamble of a SC (802.11b) signal. Every time such interference occurs, the AP may falsely identify a SC input, raise CCA-CS and attempt decoding. The CCA-CS is lowered every time a decoding attempt ends.

Thus, such narrowband interference may cause high invalid CCA-CS rate. Another example is the case of a neighboring WLAN (802.11) network, which operates on a neighboring channel. Its traffic may be falsely detected by the AP, and with high traffic on neighboring networks, high CCA-CS false alarm rate may occur.

In case of high invalid CCA-CS in step 63, the DIH processor computes new signal detection thresholds, according to the type of false alarms. Since the PHY contains separate detectors for OFDM signals and for single carrier (SC) signals, each signal detector is separately examined in steps 64 and 65, and higher detection thresholds are set and translated into a new PHY configuration in step 66.

In case there is no severe interference detected in step 61, the AP performs fine-tuning of some PHY parameters. For example, in step 67 it captures the noise plus interference and then in step 68 it computes the average interference level from the $M_2$ captures. If the average interference level is above the nominal noise level, then the AGC reset value is set such that the measured digital noise level will be near the nominal value. Another possibility is to determine new PHY detection thresholds according to correlation statistics calculated on these captures.

The next step is to check in step 70 if detection based update is required. This can be a configuration of the DIH algorithm or a dynamic decision based on interference level estimation. If not update is required, a new PHY configuration is calculated in step 69.

If a detection update is required, the DIH processor computes the correlation level of the captures with OFDM and SC signals in steps 71 and 72, respectively. It then sets the correlation levels of an OFDM signal and of a SC signal for a desired false alarm rate, based on the captured interference buffers. This process ends up with a new PHY configuration in step 69.

Second Approach—Interferer Suppression Filter (ISSF)

Figure 7:
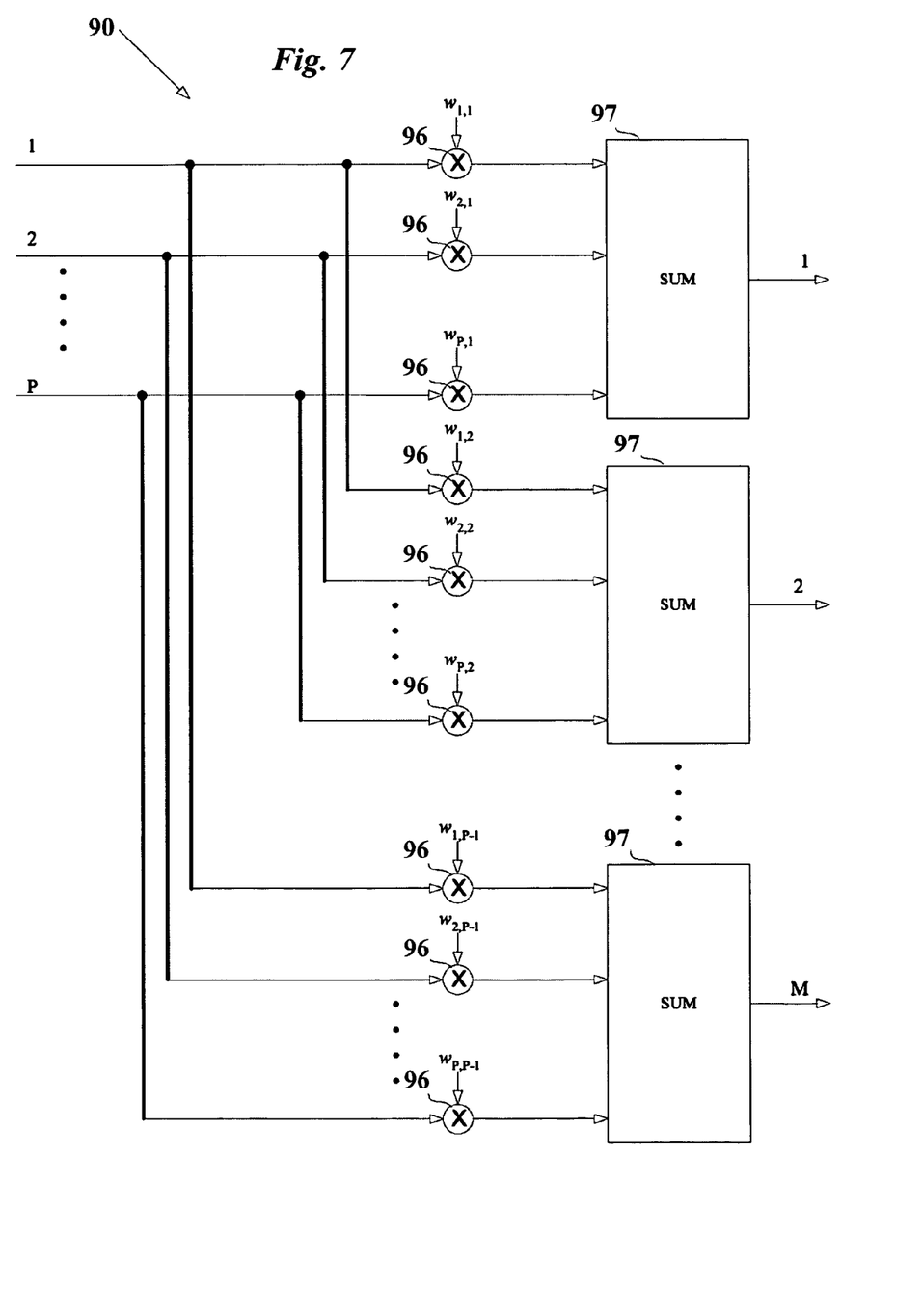
FIG. 7 is a block diagram of an exemplary implementation of an interference suppression filter for P–M interfering sources, according to an embodiment of the invention.

FIG. 7 is a block diagram detailing a possible implementation of ISSF 19 shown in FIG. 1. The circuit 90 implements a projection of the P dimensional input onto a M≦P dimensional space. Assuming an input vector x of size [1×P], the output y is a [1×M] vector given by $$y = x \cdot W, \quad (eq.\ 1)$$

where W is a [P×M] filter having components $w_{i,j}$, where i ranges from 1 to P and j ranges from 1 to M. Methods for computing W are given below. Note that this implementation reduces the number of effective antenna processing chains from P to M. The circuit 90 implements this by P×M multiplications 96 of the P signals by the components $w_{i,j}$, followed by summing the results using M summation blocks 97.

When the ISSF filter of eq. 1 above is applied in the time domain, per sample, it enables interference nulling to P−M directions. If the input is a wideband signal, like in the case of a WLAN system, the interference suppression is wideband. That is, the spatial filter in time domain is a single tap filter, which means it equally suppresses all frequencies in the interference direction. Thus this ISSF filter is most effective for wideband interference.

Figure 8:
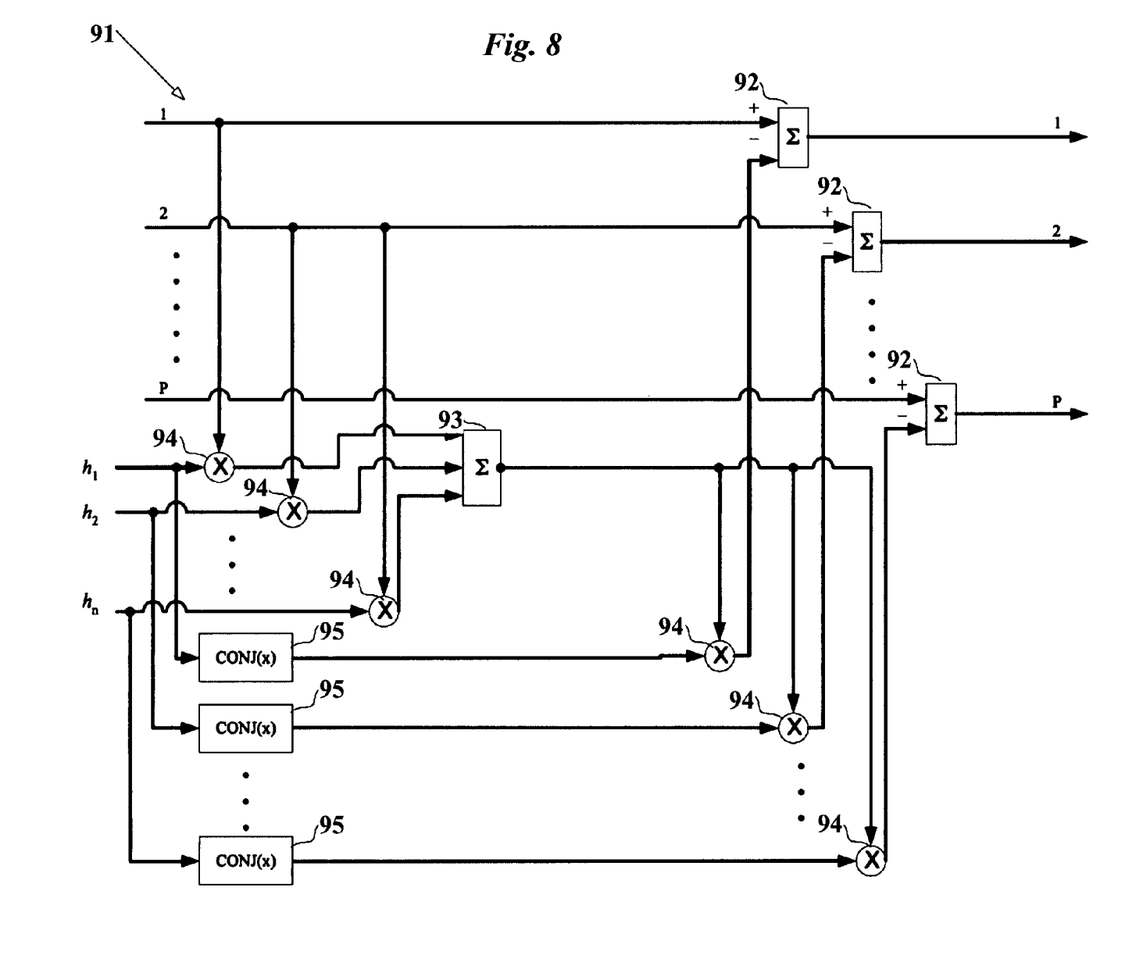
FIG. 8 is a block diagram of an exemplary efficient implementation of an interference suppression filter for one main interfering source, according to an embodiment of the invention.

FIG. 8 is a block diagram of a circuit 91 that efficient implements an ISSF for wideband interference suppression of a single source. Assuming the interference spatial signature is $h_I$, then a projection on its orthogonal space is given by $$W = I - h_I (h_I^H h_I)^{-1} h_I^H, \quad (eq.\ 2)$$

where I is a [P×P] identity matrix, and $h_I^H$ is the Hermitian transpose of $h_I$. Since $h_I$ is a [P×1] vector with components $h_1$ to $h_P$, the implementation of the filter in eq. 2 may be done efficiently using only 2P multipliers 94, instead of the less efficient implementation requiring MP multipliers, as shown in FIG. 7. The efficient implementation of FIG. 8 also uses a set of P conjugators 95, a set of P adders 92, and adder 93.

Figure 9:
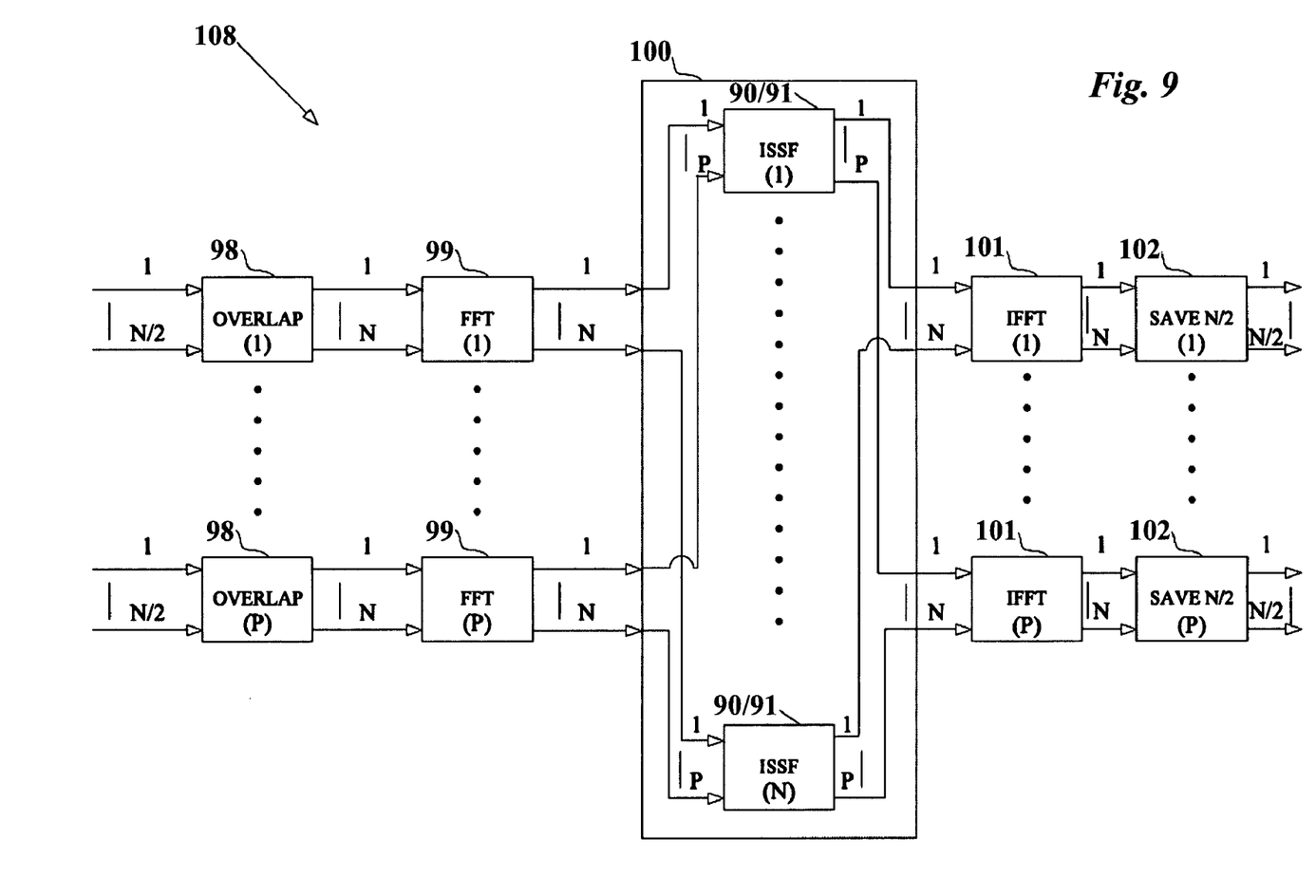
FIG. 9 is a block diagram of an exemplary implementation of suppressing multiple interferences with efficient narrow-band interference suppression, according to an embodiment of the invention.

FIG. 9 is a block diagram of a circuit 108 implementing an ISSF for suppressing a narrowband interference and for multiple interferers from multiple directions. The implementation is equivalent to a time-domain multiple-tap spatial filter, but for efficient implementation is carried out in the frequency domain. The outputs of the filter, after interference suppression, are transformed back to the time domain, making the filter implementation 108 applicable as ISSF 19 (FIG. 1).

In order to implement a linear filter in the frequency domain, a sub-block implementing overlap and save in time-domain is employed. This is required since operation on separate blocks without overlap using a fast Fourier transform (FFT) is not equivalent to a continuous time convolution with a given filter. In order to approximate the continuous convolution (rather than cyclic convolution) on the input signal, the following steps are carried out. At the input to the ISSF every N/2 consecutive samples are used twice, once with the previous N/2 samples, and again with the next N/2 samples. This is formally described as follows. On channel 1, at time n, the input to the ISSF is $x_1(n, \ldots, n+N-1)$, while the next input, at time n+N/2, is $x_1(n+N/2, \ldots, n+3N/2-1)$. This creates an overlap, which doubles the processing rate in frequency domain compared to the time domain input samples rate. The overlap is performed by P blocks 98, and performed separately per channel.

The output of each overlap block 98 is an N length vector. This is input to an N length FFT 99. The size of the FFT 99 (and thus Overlap 98) can vary, depending on the resolution of frequency domain processing required and the implementation complexity constraints. Generally, $N \leq K$, where K is the FFT size of the OFDM modulation in the WLAN system. Indeed, even for the case of a narrowband interference with a bandwidth smaller or equal than that of a single sub-carrier, using N=K will allow suppression of interference in a specific sub-carrier, without essentially affecting the signal-to-noise ratio (SNR) of the other sub-carriers. When using N=K/4, for example, the ISSF operates jointly on 4 sub-carriers. In this case, if the interference captures only two sub-carriers, it will be suppressed for those two carriers, while lowering the SNR of the other two sub-carriers. However, since joint coding is employed over all sub-carriers in WLAN, the effect of lowering the SNR in the adjacent sub-carriers will be negligible compared to the interference suppression benefits in the targeted sub-carriers.

The outputs of the FFT blocks 99 (a total of P samples per sub-carrier) are fed into a set of N ISSF blocks 100, which perform narrowband interference suppression. It is worth noting that each of the ISSF blocks 100 can be implemented as described in FIG. 7 or FIG. 8.

In case there are multiple interferers for some sub-band, an alternative efficient implementation to that shown in FIG. 8 (which supports only single source interference suppression), and complementary to that shown in FIG. 9 is presented. Assuming the interference spatial signature is $H_I$ (of size [P×(P−M)]), then a projection on its orthogonal space is given by $$W = I - H_I(H_I^H H_I)^{-1} H_I^H, \quad (\text{eq. 3})$$

where I is a [P×P] identity matrix, and $H_I^H$ is the Hermitian transpose of $H_I$. Since $H_I$ is a [P×(P−M)] matrix, the implementation of the filter W in eq. 3 may be done efficiently using only (P−M)P multipliers, instead of (M−1)P multipliers used in FIG. 7. The efficiency of the implementation method depends on the number of sources P−M to be suppressed.

In frequency bands, where no interference exists, the filter W should be a unity matrix (I). As a result, frequency bands with no interferer do not suffer from distortions caused by the filter, whose calculation was performed on noise only. Such a filter is achieved in an implementation, such as FIG. 8, by setting all coefficients $h_i$ to zero, or in a multi-interferer implementation, such as in eq. 3, by setting $H_I=0$.

The outputs of the ISSF blocks 100 in FIG. 9 are routed back to P inverse FFT (IFFT) blocks 101 of length N. The output of N samples in time domain enters the P save blocks 102, where only N/2 samples are selected out of every N samples. The N/2 selection is preferably optimized to best approximate an equivalent continuous time convolution of the input stream with the ISSF 100 time domain filters.

The estimation of $H_I$ can be based on the interference captures available in the DIH processing stages, as described in FIG. 3. Another alternative for dynamic capturing and real-time processing is depicted in the timing diagram shown in FIG. 10.

Figure 10:
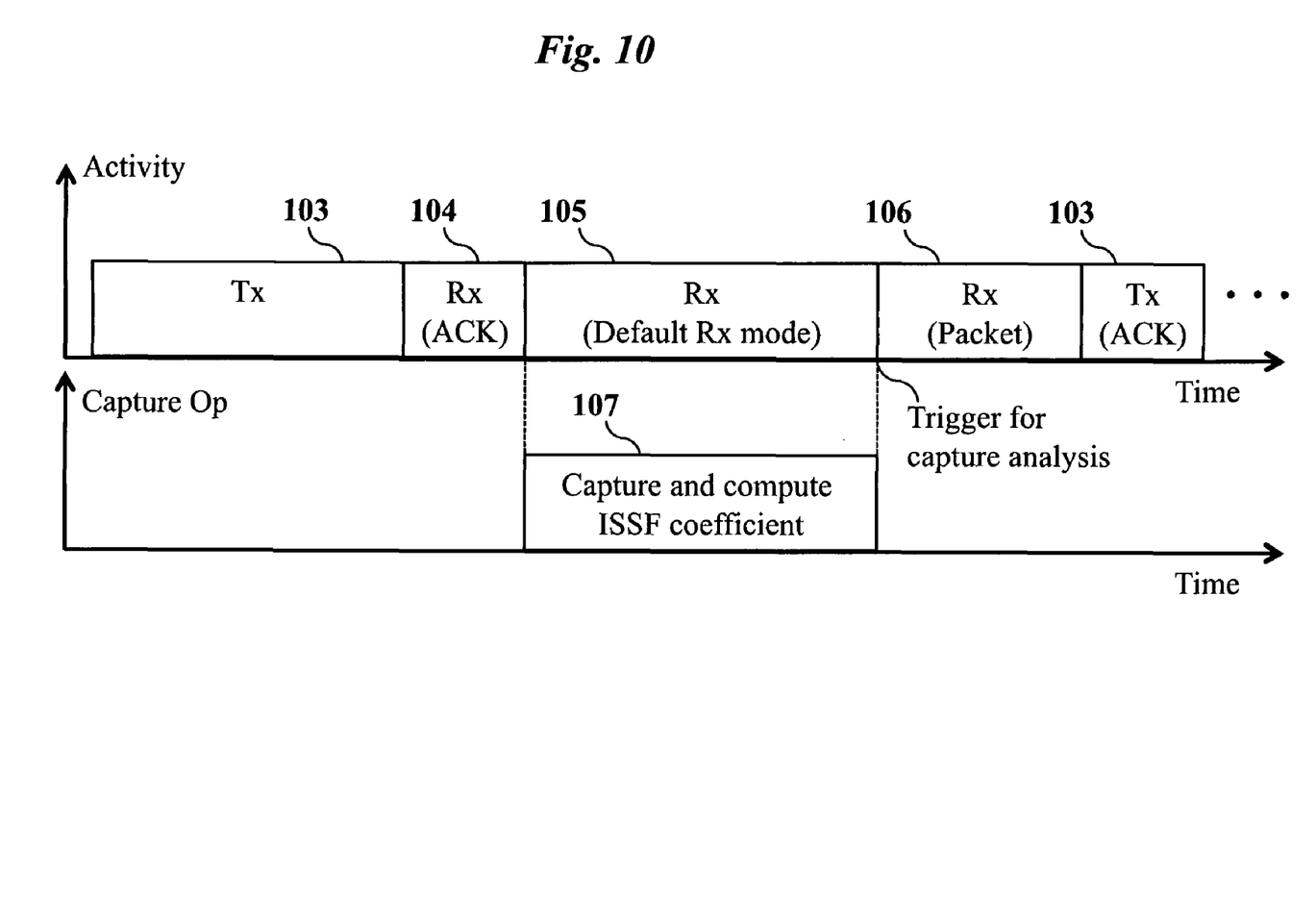
FIG. 10 is an exemplary timing diagram of interference sample capturing opportunities for interference estimation and ISSF coefficients calculation, according to an embodiment of the invention.

FIG. 10 exemplifies AP activity, which includes a downlink transmission (Tx) 103 followed by receiving an acknowledgment (ACK) packet 104. The AP then waits in its default Rx mode 105, which is the default mode when there is no transmit or receive operation. During this period the AP should generally receive only the interference. However, since according to the WLAN random access protocol existing or new clients may transmit in a random manner, the AP must make sure it has captured the interference just before the detection of a valid WLAN signal. One way to do that is by continuously saving a fixed length buffer of recent inputs, and on a trigger of Rx packet detection 106, start analyzing and computing/updating the ISSF coefficients based on the RX default capture 105 done before valid WLAN signal detection.

Another opportunity for interference capture is during default Rx mode 105, when no valid detection or false alarm occurs. A third opportunity is after AP returns an ACK on a received packet 103. A fourth opportunity for capture is during long duration CCA-ED, when no valid WLAN signal is found.

During slots of Rx default mode 105, the AP can continuously capture and calculate ISSF coefficients 107, and update previous values according to new captures. When a valid signal is detected, this update stops and coefficients' values are frozen. This assures that the ISSF be effective even for burst interferers. It should be noted that during all other operational modes (which are not Rx default) the ISSF weights are not updated.

A possible way to update the weights even during the reception of valid packets is to save the received packets into buffers, and subtract the decoded data from the buffers (a technique known also known as signal cancellation). After cancelling the valid received packet from the received input signal, the interference spatial signature may be estimated, and the ISSF coefficients may be updated.

Figure 11:
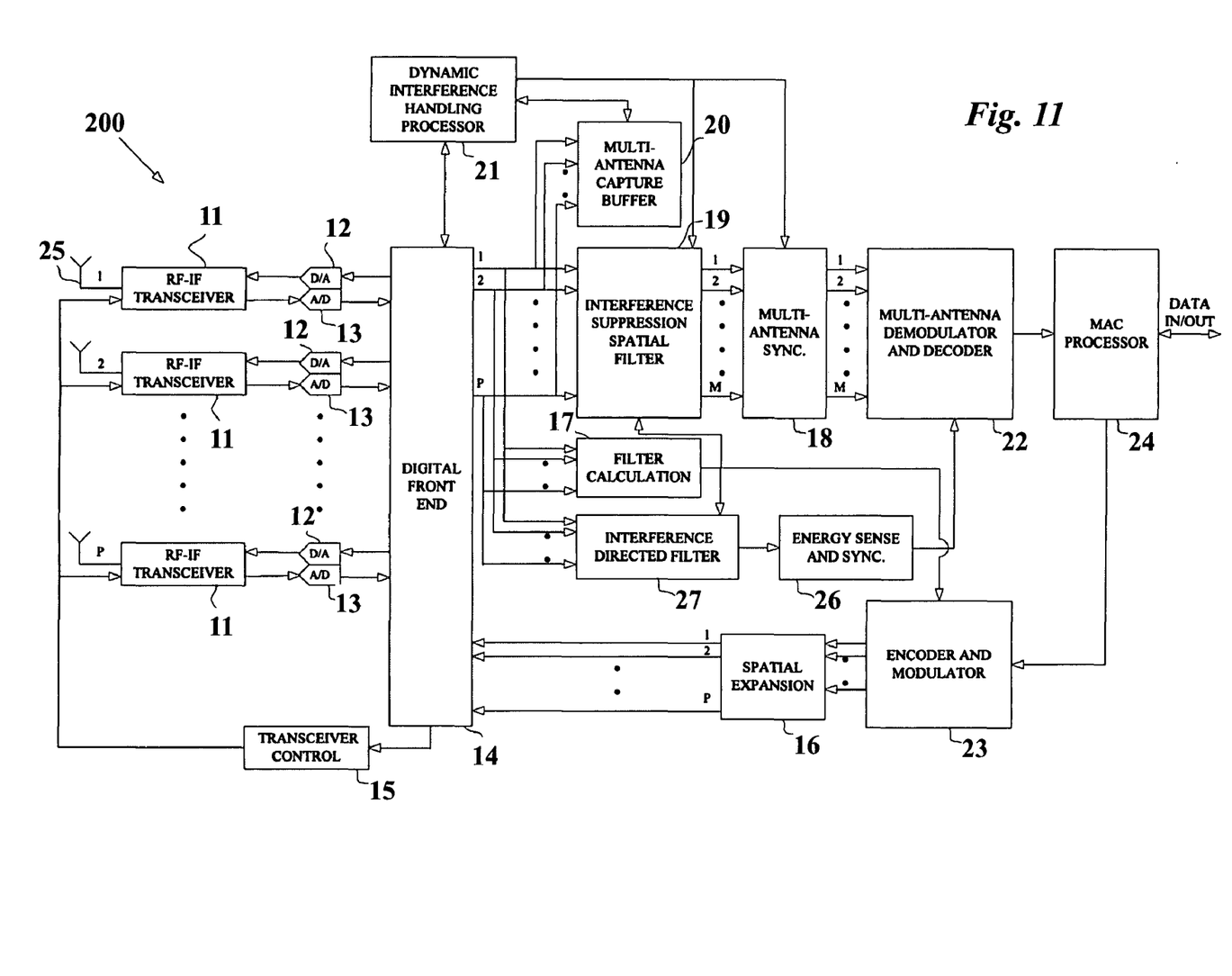
FIG. 11 is a block diagram of a WLAN access point (AP) system, with DIH and ISSF, which includes dedicated efficient processing for the interference, according to an embodiment of the invention.

FIG. 11 illustrates an exemplary system block diagram 200, which is similar to the one described in FIG. 1, with one additional signal processing path based on an interference-directed-filter 27 followed by an energy detector and synchronization block 26. All other blocks are the same as those described in FIG. 1 unless otherwise noted. The motivation for adding this signal-processing path with blocks 26 and 27 is to be able to decode the strong clients which are located in the direction of the interference. Such clients cannot be generally decoded since the ISSF 19 suppresses transmission from the interference direction.

When a desired client has a spatial signature (channel response) highly correlated with $H_I$, it will be strongly attenuated at the output of the ISSF. Therefore, another projection filter 27 is used in the interference direction. The output of this filter is a single digital processing channel, which is followed by the sync and energy detection block 26. This block 26 is different from the multi-antenna sync block 18, since it has to detect signal with higher energy than that of the interference. Note that in the direction of the interference one cannot benefit from the processing gain of the multi-antenna maximal ratio combining (MRC) since both the desired signal and the interference enjoy the same processing gain. Hence, a combination of a signal detection based on correlation and energy above a certain threshold may serve for robust processing of clients transmitting from the direction of the interference.

The ISSF coefficients for coping with $H_I$ may be estimated as follows. Consider the following model for the capture of noise and interference, $$Y_I = H_I S_I + N_I, \quad (\text{eq. 4})$$

where $Y_I$ is the [P×L] capture matrix, $N_I$ is the [P×L] noise matrix, $H_I$ is a [P×(P−M)]spatial signature of the interferences, and $S_I$ is the [(P−M)×L] matrix of the interferences signals. The equivalent channel between the interference source and the AP is $H_I$, which is also referred to as the interference spatial signature. For a given $Y_I$, the $H_I$ can be obtained as a solution to the following optimization problem $$\min_{H_I, S_I} \|Y_I - H_I S_I\|^2. \qquad \text{(eq. 5)}$$

Given the observation $Y_I$, the maximum-likelihood (ML) estimation of the interference signal $S_I$ is given by $\hat{S}_I = (H_I^H H_I)^{-1} H_I^H$. Replacing $S_I$ by its ML estimation $\hat{S}_I$ in eq. 5 provides the following optimization problem $$\min_{H_I} \|Y_I - H_I(H_I^H H_I)^{-1} H_I^H Y_I\|^2, \qquad \text{(eq. 6)}$$

where the minimization is over the projection matrix filter $W = I - H_I(H_I^H H_I)^{-1} H_I^H$. The solution for this optimization problem is given by the eigenvectors, which correspond to the (P−M) strongest singular values of $R_Y \equiv Y_I Y_I^H$. Let the singular value decomposition (SVD) $R_Y$ be denoted by $R_Y = U\Sigma U^H$, where $\Sigma$ is a diagonal matrix containing the ordered singular values of $R_Y$, denoted by $\sigma_1 \leq \sigma_2 \leq \ldots \leq \sigma_P$. Thus the solution to eq. 6 is a [P×(P−M)] matrix $H_I$ containing the eigenvectors of U, which correspond to $\sigma_{P-M} \leq \sigma_{P-M+1} \leq \ldots \leq \sigma_P$.

In order to dynamically choose the filter order M, the singular values of $R_Y$ can be examined. One exemplary criterion, which may serve well for estimating the number of effective interference sources, is to compute the set A $$A = \left\{ \frac{\sigma_K}{\sigma_1} \right\}_{K=2}^{P}, \qquad \text{(eq. 7)}$$

and choose M=K−1 such that it is the smallest value for which $$\frac{\sigma_K}{\sigma_1} \geq TH_1,$$

where $TH_1$ is a predefined threshold. In case there is no value of K such that $2 \leq K \leq P$ and $$\frac{\sigma_K}{\sigma_1} \geq TH_1$$

then M=P is used, indicating there is no dominant interference.

Another exemplary criterion for estimation of the ISSF order M is based on the following set B $$B = \left\{ \frac{\sigma_K}{\sigma_{K-1}} \right\}_{K=2}^{P}. \qquad \text{(eq. 8)}$$

One then chooses M=K−1 such that it is the smallest value for which $$\frac{\sigma_K}{\sigma_1} \geq TH_2,$$

where $TH_2$ is a predefined threshold. This criterion may sometimes be more robust than the previous criterion, for high variance of the singular values of $R_Y$ without interference. Here again, in case there is no value of K such that $2 \leq K \leq P$ and $$\frac{\sigma_K}{\sigma_1} \geq TH_2$$

then M=P is used, indicating there is no dominant interference.

Decision upon the existence of interference can be performed in several ways. One of them is by comparing the energy of the signal in the specified band to the well known expected noise level. Another way is compare the signal condition number to a threshold. The condition number is defined as $$\gamma = \frac{\sigma_P}{\sigma_1}.$$

Another alternative for an ISSF 19 (or 100) is the following. Consider the following channel model $$X = H_S S_S + H_I S_I + N_I, \qquad \text{(eq. 9)}$$

where $H_S$ is the [P×1] channel response of the desired signal $S_S$ [1×L], and $Y_I = H_I S_I + N_I$ is the [P×L] noise capture matrix, with $H_I$ being the [P×(P−M)] spatial signature of the interferences. The optimal MMSE beamforming weight for eq. 9 is $W_{BF} = H_S^H R_X^{-1}$. Yet, since it can be shown that $R_Y^{-1} H_S = R_X^{-1} H_S$, it follows that the filter $W_{BF} = H_S^H R_Y^{-1}$ is also optimal, and can be partially computed based on long training estimation even before the desired signal ramp-up (like demonstrated in FIG. 10).

In such case, an approximated ISSF W may be used, which is $W = R_Y^{-1}$. In case there is a dominant interferer, and the interference to noise ratio (INR) is rather high, the dominant singular values of $R_Y^{-1}$ are those associated with the noise (and not with the interferers).

Therefore, an approximate computation of $R_Y^{-1}$, with an adequate normalization according to the noise standard deviation, may be used also as spatial filter estimation. In addition, the optimal MMSE beamforming weight $W_{BF} = H_S^H R_Y^{-1}$ can be obtained by applying $H_S^H$ on this ISSF output.

In the process of computing the ISSF 100, it is preferably to include a smoothing operation in order to eliminate detection and decoding performance degradation by deterioration of the time domain characteristics of the received signal. This smoothing is needed only if the filter operates on sub-bands in frequency domain and is not identical over all sub-carriers. That is, there is no need for smoothing in the filter coefficients' for using the ISSF 90 and ISSF 91 or their variations as defined in eq. 6 in time domain. This is needed only for sub-band processing. The reason for this is that a narrowband filter, which is not carefully designed, may induce a long time-domain response. In such case, it may add severe inter-symbol interference (ISI) to the received signal. If this ISI is long, a conventional OFDM detector may not function well, as it is usually designed to cope with ISI in a length of the guard interval, which might already be exploited due to multipath propagation delay of the signal. Hence, a careful design of smoothing is required after independent computation of each sub-band spatial filter, such that the equivalent time domain response will not exceed a predetermined threshold.

The invention claimed is:

1. A method for communications over a wireless local area network, the method comprising:

receiving at a wireless access point signals transmitted from client devices and signals transmitted from interfering devices, wherein the receiving coherently uses multiple antennas connected to a common local oscillator, wherein the receiving of the signals transmitted from the interfering devices is performed when no signals are transmitted from the client devices;

measuring at the wireless access point from the received signals transmitted from the interfering devices at the wireless access point noise and interference capture samples;

computing at the wireless access point from the measured noise and interference capture samples a characterization of noise plus interference due to the interfering devices;

adjusting at the wireless access point receive gains and threshold levels based on the computed noise plus interference characterization;

calculating at the wireless access point from the measured noise and interference capture samples a set of weights for an interference suppression spatial filter;

spatially filtering at the wireless access point the received signals transmitted from the client devices using the calculated weights to produce a filtered signal, such that interference from the interfering devices is spatially nulled in the filtered signal; and adjusting at the wireless access point a correlation detection threshold based on the computed noise plus interference characterization.

2. The method of claim 1 further comprising transmitting from the wireless access point a protection transmission requesting the client devices to suspend transmissions during a specified time period.

3. The method of claim 1 wherein the computed noise plus interference characterization comprises a noise energy level and a correlation of interference with a preamble of WLAN signals.

4. The method of claim 1 wherein the computed noise plus interference characterization comprises an average interference level during specified sample periods.

5. The method of claim 1 wherein the computed noise plus interference characterization comprises an average of highest values of interference level.

6. The method of claim 1 further comprising determining a type of interference as being of short duration or long duration.

7. The method of claim 1 further comprising setting at the wireless access point PHY parameters based on the computed noise plus interference characterization.

8. The method of claim 1 wherein measuring the noise and interference capture samples comprises detecting a valid WLAN signal and processing buffered samples captured just prior to the detected valid WLAN signal.

9. The method of claim 1 wherein measuring the noise and interference capture samples comprises processing buffered samples captured during default Rx mode.

10. The method of claim 1 wherein measuring the noise and interference capture samples comprises processing buffered samples captured after the wireless access point returns an ACK on a received packet.

11. The method of claim 1 wherein measuring the noise and interference capture samples comprises processing buffered samples captured during long duration CCA-ED in which no valid WLAN signal is found.

* * * * *